No. 664,211. Patented Dec. 18, 1900.
E. C. CLAPP.
MICROMETER GAGE.
(Application filed Mar. 10, 1900.)
(No Model.)

UNITED STATES PATENT OFFICE.

EDWARD C. CLAPP, OF ATHOL, MASSACHUSETTS.

MICROMETER-GAGE.

SPECIFICATION forming part of Letters Patent No. 664,211, dated December 18, 1900.

Application filed March 10, 1900. Serial No. 8,110. (No model.)

*To all whom it may concern:*

Be it known that I, EDWARD CLIFTON CLAPP, of Athol, in the county of Worcester and State of Massachusetts, have invented certain new and useful Improvements in Micrometer-Gages, of which the following is a specification.

This invention relates to micrometer gages or calipers; and one of its objects is to provide an adjustment between the hardened spindle and one of the micrometer screw-threaded members whereby the spindle may be adjusted to compensate for wear on its end.

Another object of the invention is to incase the parts in an improved manner, so as to protect the micrometer-screw from the entrance of dust and dirt.

The invention also contemplates the provision of a shell on which the minor index is marked, said shell being held from longitudinal movement with respect to the micrometer-frame, but free to rotate thereon, and a main index member made as a separate part and arranged outside of and parallel to the spindle and micrometer-screw, said index member being connected to and movable longitudinally with the spindle, but held from rotation with respect to the micrometer-frame.

Figure 1:
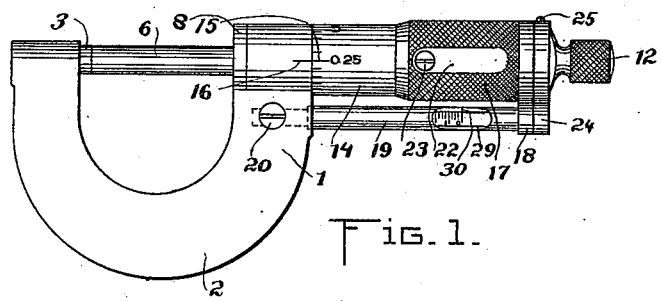
Figure 2:
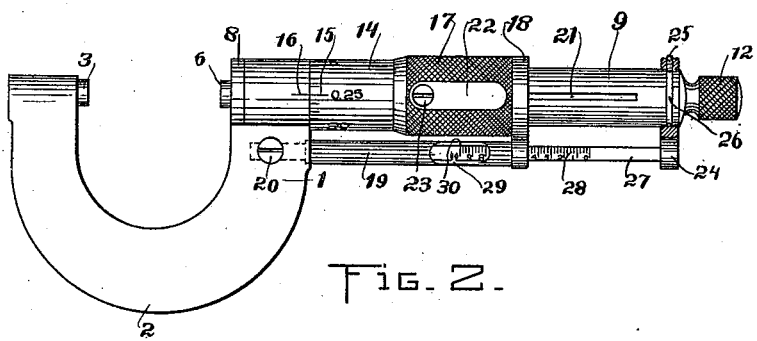
Figure 3:
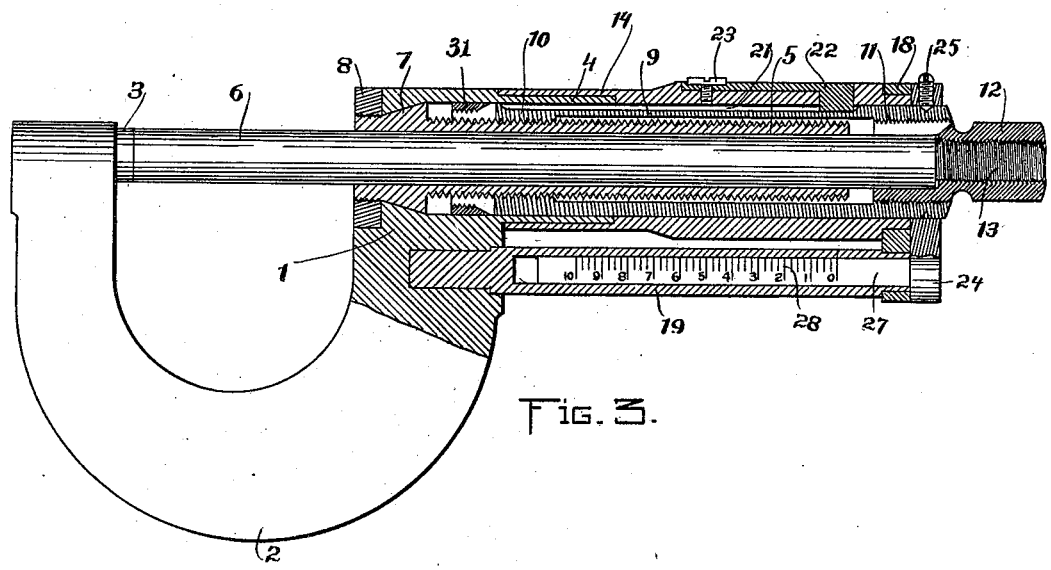

Of the accompanying drawings, Figure 1 represents a side elevation of a micrometer-gage constructed in accordance with my invention, the gage being closed. Fig. 2 represents a similar view of the gage open. Fig. 3 represents a sectional view of the gage closed.

The same reference characters indicate the same parts in all the figures.

Referring to the drawings, 1 designates the micrometer-frame, which is here shown as extended in a curved form to form a shank 2, supporting at its outer end the anvil 3. My invention, however, does not relate to the form and construction of the shank and anvil, and the same may be modified as desired without departing from my invention. The inner end of the frame 1 is tubular and constitutes a part of the supporting-barrel, said barrel having an extension 4 projecting beyond the frame proper.

5 represents the micrometer-screw, having a screw-thread on its exterior and a smooth internal bore in which the spindle 6 is fitted to slide. One end of the screw 5 is formed with a taper shoulder 7, which is drawn to a taper seat within the tubular frame 1 by means of a nut 8 engaging the reduced screw-threaded end of said screw.

9 represents a micrometer-nut, consisting of an elongated sleeve having at one end an internal screw-thread 10 engaging the thread on the micrometer-screw 5, and at its other end an internal screw-thread 11 engaging an external thread formed on a clamping-nut 12, the threaded portion 11 of the micrometer-nut being slightly tapered and the threaded portion of the clamping-nut 12 split lengthwise and surrounding the end of the spindle 6, so that when the clamping-nut 12 is screwed into its socket in the micrometer-nut it will be caused to tightly engage the spindle, and thus clamp the spindle adjustably to the micrometer-nut. The clamping-nut 12 is also formed with an internal screw-thread engaging a short screw-threaded portion 13 on the end of the spindle 6. By rotating the spindle 6 by any suitable means, as by applying a screw-driver to a slot (not shown) in the end of the spindle 6, the clamping-nut having been loosened from engagement with the micrometer-screw, the spindle may be adjusted within the clamping-nut to compensate for wear on its working end.

It will be seen that both the micrometer-screw 5 and the micrometer-nut 9 extend within the barrel 4 and are protected thereby from the entrance of dust.

14 represents a tubular shell, the inner end of which closely surrounds the barrel 4 and is externally graduated at 15 with the usual decimal index registering with a mark 16 on the outside of the barrel. The outer portion 17 of said shell is knurled or roughened to provide a hold for the fingers, and beyond said roughened portion is a ring or collar 18, attached to the outer end of an arm 19, whose inner end is secured to the frame 1 by means of a screw 20. Being confined between the collar 18 and the frame 1, the shell 14 is held from longitudinal movement with respect to the frame, but is permitted to rotate. The shell is closely fitted to the other parts, so as to rotate with some frictional resistance. This resistance may be varied by loosening the attaching-screw 20, moving arm 19 a slight distance longitudinally in one direction or the other, and retightening said screw. The micrometer-nut 9 is also free to rotate and has a spline connection with the shell 14, so that the two rotate together. Said connection, as here shown, comprises a longitudinal groove 21 on the outside of the nut 9 and a spline or key 22, having a spring-shank secured by a screw 23 to the outside of the shell 14, and a head which projects through an aperture in said shell and engages the groove 21. The shell and nut may be rotated either by turning the knurled shell or by turning the head of the clamping-nut 12, which is also knurled.

Attached to the micrometer-nut 9 by means of a collar 24, having a screw 25, the end of which enters an annular groove 26, formed externally on the end of the micrometer-nut, is an index-rod 27, projecting within the arm 19, which latter is made tubular and constitutes a socket to receive said index-rod. When the arm 19 is made tubular, the rod 27 is of course made circular in cross-section to fit the socket of said rod, which socket is of course round in cross-section. The rod 27 is not surface-shaded in the drawings to represent it as circular in cross-section, for the reason that such surface-shading would confuse the graduation-marks or scale hereinafter referred to. I desire to state, however, that I do not desire to be understood as restricted to the particular shape of the rod and socket; but I prefer to make both round in cross-section. Since the rod 27 operates within the tubular arm 19, it is held from rotation with respect to the micrometer-frame, and it follows the longitudinal movement of the micrometer-nut 9 by virtue of the connection of its collar 24 with said nut, the nut being, however, free to rotate within said collar. The rod 27 is graduated longitudinally at 28 in convenient units, such as the inch and fractions thereof, which graduations are seen through an aperture 29 in the wall of the tubular arm 19 and register with a mark 30 on the edge of said aperture.

The spindle 6, micrometer-nut 9, and main index-rod 27 all move together longitudinally when the nut is rotated. The main index therefore gives a direct reading of the distance between the anvil and the end of the spindle. The shell 14 rotates with the spindle and nut, but does not move longitudinally. Its index gives the decimal reading, indicating the fractional parts of the spindle turns. This reading is more easily taken with the longitudinally-immovable shell than with one which travels along over its barrel. The shell 14 being superimposed upon the barrel in the manner described gives an added protection from dust and dirt to the micrometer-screw.

31 is an adjusting-nut fitting on the split, threaded, and tapered inner end of the micrometer-nut 9 and adapted to take up wear between said nut and the micrometer-screw 5.

I claim—

1. A micrometer-gage comprising a supporting-barrel, a spindle and a screw-threaded member both movable in said barrel, a complemental screw-threaded member separate from and fixed within the barrel, said members being tubular and surrounding the spindle, and means for detachably securing the spindle to the said screw-threaded movable member.

2. A micrometer-gage comprising a supporting-barrel, a spindle and a screw-threaded member both movable in said barrel, a complemental screw-threaded member separate from and fixed to the barrel, said members being tubular and surrounding the spindle, and means for detachably securing the spindle to the said screw-threaded movable member, said means having provisions for adjusting the spindle lengthwise to compensate for wear.

3. A micrometer-gage comprising a supporting-barrel, a tubular externally-threaded micrometer-screw affixed thereto, a spindle movable lengthwise in said tubular screw and having a short screw-thread on its rear portion, a split or compressible locking-nut engaged with said screw-thread and having an external thread, a micrometer-nut engaged at one end with the fixed micrometer-screw and at the other end with the external thread of the locking-nut, and a tubular shell connected to the exterior of the micrometer-nut and projecting over the latter and movable over the barrel.

4. A micrometer-gage comprising a supporting-frame, a spindle, a screw-threaded member fixed to the frame, a complemental movable screw-threaded member fixed to the spindle, a shell held from longitudinal movement with respect to the frame but free to rotate, and a spline connection between said shell and the movable screw-threaded member.

5. A micrometer-gage comprising a supporting-frame, a spindle, a screw-threaded member fixed to the frame, a complemental movable screw-threaded member fixed to the spindle, a shell held from longitudinal movement with respect to the frame but free to rotate, a spline connection between said shell and the movable screw-threaded member, and an index member held from rotation with respect to the frame and attached to and movable longitudinally with the movable screw-threaded member and spindle.

6. A micrometer-gage comprising a supporting-frame, a spindle, a screw-threaded member fixed to the frame, a complemental movable screw-threaded member fixed to the spindle, a shell held from longitudinal movement with respect to the frame but free to rotate, a spline connection between said shell and the movable screw-threaded member, a tubular arm fixed to the supporting-frame, and an index-rod movable within said arm and held thereby from rotation with respect to the frame, said rod being attached to and movable longitudinally with the movable screw-threaded member and spindle.

7. A micrometer-gage comprising a supporting-frame, a spindle, a screw-threaded member fixed to the frame, a complemental movable screw-threaded member fixed to the spindle, an arm fixed to the supporting-frame and having a collar, a shell held between said collar and the frame and free to rotate, and a spline connection between said shell and the movable screw-threaded member.

8. A micrometer-gage comprising a supporting-frame, a spindle, a screw-threaded member fixed to the frame, a complemental movable screw-threaded member fixed to the spindle, a tubular arm fixed to the supporting-frame and having a collar, a shell held between said collar and the frame and free to rotate, a spline connection between said shell and the movable screw-threaded member, and an index-rod movable within said arm and held thereby from rotation with respect to the frame, said rod being attached to and movable longitudinally with the said movable screw-threaded member and spindle.

9. A micrometer-gage comprising a supporting-frame, a spindle, a screw-threaded member fixed to the frame, a complemental movable screw-threaded member fixed to the spindle, a shell held from longitudinal movement with respect to the frame but free to rotate, a spline connection between said shell and the movable screw-threaded member, a tubular arm fixed to the supporting-frame, and a graduated index-rod movable within said arm and held thereby from rotation, said arm having an aperture through which to read the graduations on the index-rod, said rod being attached to and movable longitudinally with the movable screw-threaded member and spindle.

10. A micrometer-gage comprising a supporting-frame, a spindle, a screw-threaded member fixed to the frame, a complemental movable screw-threaded member fixed to the spindle, an arm removably attached to the supporting-frame and having a collar, a shell held between said collar and the frame and free to rotate, means for adjusting said arm to vary the frictional bearing of said collar on the shell, and a spline connection between said shell and the movable screw-threaded member.

11. A micrometer-gage comprising a supporting-frame, a spindle, a screw-threaded member fixed to the frame, a complemental movable screw-threaded member fixed to the spindle, a shell held from longitudinal movement with respect to the frame but free to rotate, a spline connection between said shell and the movable screw-threaded member, an index-rod held from rotation with respect to the frame and having a collar loosely surrounding and held from longitudinal movement with respect to the movable screw-threaded member.

12. A micrometer-gage comprising a supporting-frame, a spindle, a screw-threaded member fixed to the frame, a complemental movable screw-threaded member fixed to the spindle and having an external longitudinal groove, a shell held from longitudinal movement with respect to the frame but free to rotate, and a spline having a stem screwed to the outside of said shell and a head projecting into said groove.

In testimony whereof I have affixed my signature in presence of two witnesses.

EDWARD C. CLAPP.

Witnesses:
   EDGAR V. WILSON,
   WILLIAM G. LORD.